Aug. 10, 1954  YOSHIMITSU OISHI  2,686,011
APPARATUS FOR RECLAIMING RUBBER MATERIAL
Filed May 13, 1953
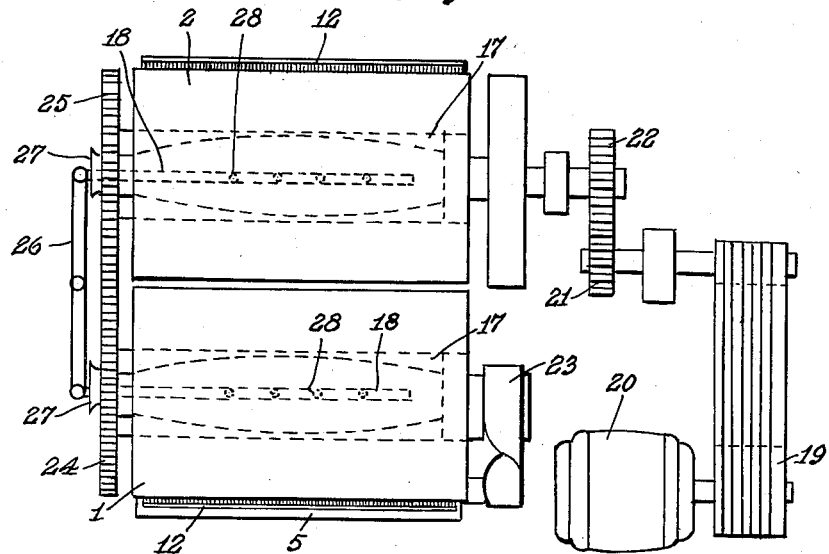
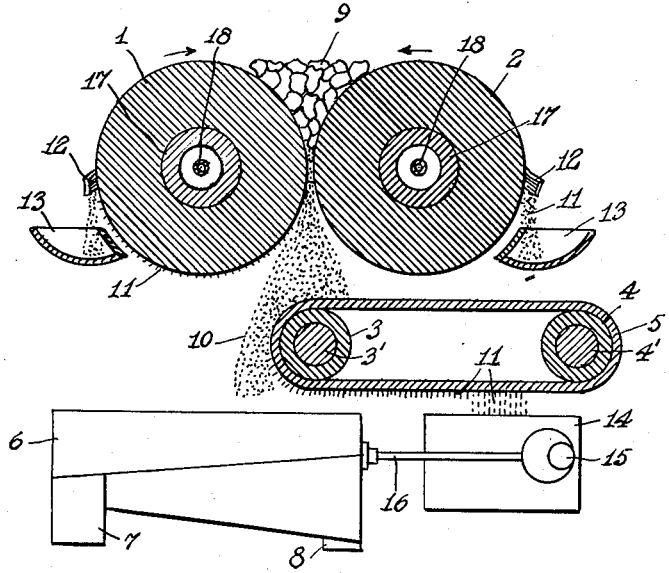
INVENTOR.
YOSHIMITSU OISHI
BY
ATTORNEY.

Patented Aug. 10, 1954

2,686,011

UNITED STATES PATENT OFFICE 2,686,011

APPARATUS FOR RECLAIMING RUBBER MATERIAL

Yoshimitsu Oishi, Shioya-Gun Tochigi-Ken, Japan

Application May 13, 1953, Serial No. 354,714

1 Claim. (Cl. 241—79)

The present invention relates to apparatus for reclaiming scrap rubber and particularly to apparatus for separating the fiber and the rubber from rubber scrap such as tire casings. The term "rubber" is used in a generic sense to include artificial as well as natural rubbers.

Various means have heretofore been proposed for separating the fiber and the rubber from vulcanized scrap rubber but they have not been entirely satisfactory. Chemical removal of the fiber requires careful control and is expensive. Mechanical removal of the fiber has heretofore been incomplete and unsatisfactory.

It is an object of the present invention to provide simple apparatus for separating the fiber and the rubber of vulcanized rubber scrap rapidly and effectively to produce a high grade of reclaimed rubber.

Other objects and advantages of the invention will become apparent from the following description and claim in conjunction with the accompanying drawings, in which:

Fig. 1 is a plan of apparatus embodying the invention.

Fig. 2 is a cross section of the apparatus.

The apparatus shown by way of example in the drawings comprises two hard smooth parallel closely spaced rollers 1 and 2. The rollers are formed of, or at least have an outer shell of, hard wear-resistant material such as chilled steel or white pig iron ($Fe_3C$) and are of a suitable diameter, for example 12 to 24 inches, a diameter of about 18 inches being presently preferred. The space between the rollers is very small, for example of the order of 0.5 mm., it being understood that somewhat smaller and larger spacing can be used, for example 0.25 mm. to 1 mm. The rollers 1 and 2 are arranged side by side with their axes parallel and are adapted to rotate in opposite directions so that material fed between the rollers will be discharged downwardly.

Below the rollers 1 and 2, there is provided a conveyor belt 5 supported by rollers 3 and 4 having shafts 3' and 4'. The conveyor belt 5 is formed of suitable material such as rubber or canvas. The position of the conveyor belt 5 relative to the rollers 1 and 2 is such that material discharged downwardly from between the rollers falls on the conveyor belt near its discharge end.

Below the discharge end of the conveyor belt 5, there is provided a vibrating screen or sieve 6 having discharge spouts 7 and 8 for the coarser and finer material, respectively.

As the rollers 1 and 2 are turned in opposite directions, as indicated by the arrows (Fig. 2) cut scrap rubber 9 is fed downwardly between them. The rollers 1 and 2 are driven at different peripheral speeds, the ratio of speeds being preferably approximately 10:12. It will be understood that some variation in this ratio is permissible, for example 10:11 to 10:15. The peripheral speed of the rollers 1 and 2 is preferably of the order of 100 to 250 feet per minute. Thus, with eighteen-inch rollers, the speed of rotation will be about 21 R. P. M. to 45 or 50 R. P. M., best results having been obtained with a speed of about 37 R. P. M. It will be understood that, instead of making the rollers the same size and driving them at different speeds, the rollers may be of different size and driven at the same (or different) speed in order to provide the required ratio of peripheral speeds.

The cut rubber scrap 9 fed down between the rollers 1 and 2 is subjected to an intense crushing and rubbing action which separates the fiber in the scrap from the rubber and, at the same time, generates a high electrostatic charge by friction. The electrostatic charge on the rollers becomes so high that the rollers will gleam in the dark. The particles of rubber are discharged downwardly from between the rollers 1 and 2, as indicated at 10, but, because of the electrostatic charge, the fibers 11 cling to the rollers 1 and 2 and are removed by brushes 12. The fibers removed from the rollers by the brushes 12 drop into suitable receptacles 13.

The rubber particles 10 discharged downwardly from between the rollers 1 and 2 fall onto the conveyor belt 5 which is driven at a suitable speed in the direction of the adjacent arrow. It will be seen that the rubber particles 10 fall on the conveyor 5 near its discharge end where the conveyor belt has not only a translational movement but also a rotary movement as it passes over the roller 3. The particles of rubber 10 fall off the conveyor 5 as it passes over the roller 3 while any particles of fiber 11 that have not already been removed by adhering to the rollers 1 and 2 adhere to the conveyor belt 5 because of the electrostatic charge they carry. An opposite charge is induced in the conveyor belt 5. As they are carried along by the lower return run of the conveyor belt 5, the fiber particles 11 gradually lose their charge and drop into a suitable receptacle 14. If desired, a suitable scraper or brush, for example similar to the brushes 12, can be provided for removing particles of fiber from the conveyor belt.

The screen 6 into which the particles of rubber 10 fall from the conveyor 5 is reciprocated by suitable means illustrated as an eccentric 15 and connecting rod 16. The smaller particles go through the screen and are discharged through a spout 8. The larger particles travel down the inclined screen and are discharged from the spout 7.

The apparatus is illustrated as being driven by a motor 20 through multiple V belts 19 and reducing gears 21 and 22, the gear 22 being keyed on the shaft 17 of one of the rollers. The other roller is driven from the first through gears 24 and 25, it being understood that the gear ratio is selected to provide the desired ratio of peripheral speeds of the rollers. One of the rollers of the conveyor belt 5 is driven from a pulley on the shaft 17 of one of the rollers 1, 2, for example by means of a belt 23.

It has been found desirable to control the temperature of the rollers 1 and 2 to keep it at approximately 60 to 70° C. As the rubbing action resulting from the different peripheral speeds of the rollers 1 and 2 generates heat as well as static electricity, means is preferably provided for cooling the rollers. For this purpose, the shafts 17 of the rollers 1 and 2 are shown as being hollow and a water supply pipe 18 having a plurality of discharge holes or nozzles 28 extends into the shaft of each roller. Water is supplied through suitable piping 26 and is discharged through funnel-shaped discharge passageways. Ordinarily, it will not be necessary to operate the water spray continuously. For example, the rollers may be cooled for five minutes or so at intervals of one or two hours. If desired, the supply of water to the discharge openings or nozzles 28 may be controlled by a thermostat responsive to the temperature of the rollers so as to maintain the rollers 1 and 2 at an approximately uniform temperature.

In some instances, it has been found desirable to electrically insulate the rollers 1 and 2 and also the rollers 3 and 4 of the conveyor 5. For this purpose, a layer of electrical insulating material may be provided between the rollers 1 and 2 and shafts 17. In like manner, the rollers 3 and 4 may be insulated from their shafts 3' and 4'. Alternatively, a layer of insulating material may be provided on the outside surfaces of the rollers 3 and 4.

The invention thus provides simple and effective apparatus for separating the rubber and fiber of vulcanized rubber scrap. While a specific embodiment of the invention has been illustrated and described, it is to be understood that the apparatus is subject to modification within the spirit of the invention and the scope of the appended claim.

What I claim and desire to secure by Letters Patent is:

In apparatus for reclaiming rubber material containing fiber, a pair of smooth parallel closely spaced rollers turning in opposite directions with their adjacent peripheral portions moving downwardly, cut rubber being fed downwardly between the rollers, means for driving said rollers at different peripheral speeds to provide a crushing and rubbing action on the material between them to separate fiber from the rubber and to produce an electrostatic charge on the material and on the rollers by friction, whereby fiber clings to the rollers while the rubber is discharged downwardly, a conveyor belt disposed below said rollers and positioned so that the rubber discharged from between the rollers falls on the conveyor belt near its discharge end, and means for driving said belt to discharge rubber from the end thereof while any remaining loose fiber clings to the belt by electrostatic action and is discharged from the lower run of the conveyor belt at a point removed from that at which the rubber is discharged.

References Cited in the file of this patent

UNITED STATES PATENTS

| Number | Name | Date |
|---|---|---|
| 177,062 | Downton | May 9, 1876 |
| 344,472 | Bauer | June 29, 1886 |
| 1,631,423 | Lucas | June 7, 1927 |
| 1,722,943 | Pettit | July 30, 1929 |
| 2,136,099 | Buxbaum | Nov. 8, 1938 |

FOREIGN PATENTS

| Number | Country | Date |
|---|---|---|
| 486,452 | France | Jan. 11, 1918 |